(12) United States Patent
Wade et al.

(10) Patent No.: US 9,665,582 B2
(45) Date of Patent: May 30, 2017

(54) SOFTWARE, SYSTEMS, AND METHODS FOR ENHANCED REPLICATION WITHIN VIRTUAL MACHINE ENVIRONMENTS

(75) Inventors: Gregory L. Wade, San Jose, CA (US); J. Mitchell Haile, Somerville, MA (US)

(73) Assignee: QUANTUM CORPORATION, Redmond, WA (US)

( * ) Notice: Subject to any disclaimer, the term of this patent is extended or adjusted under 35 U.S.C. 154(b) by 1059 days.

(21) Appl. No.: 13/198,123

(22) Filed: Aug. 4, 2011

(65) Prior Publication Data

US 2012/0059794 A1    Mar. 8, 2012

Related U.S. Application Data

(60) Provisional application No. 61/370,523, filed on Aug. 4, 2010.

(51) Int. Cl.
*G06F 17/30* (2006.01)

(52) U.S. Cl.
CPC .. *G06F 17/30091* (2013.01); *G06F 17/30233* (2013.01)

(58) Field of Classification Search
CPC ....... G06F 3/065; G06F 3/0653; G06F 3/0665
USPC ................. 707/626, 639, E17.008, E17.014
See application file for complete search history.

(56) References Cited

U.S. PATENT DOCUMENTS

| | | | |
|---|---|---|---|
| 4,878,221 A * | 10/1989 | Shimada .................... | 714/794 |
| 7,216,366 B1 | 5/2007 | Raz et al. | |
| 7,904,419 B1 | 3/2011 | Milby et al. | |
| 8,015,236 B2 * | 9/2011 | Holt ............................ | 709/201 |
| 8,135,930 B1 | 3/2012 | Mattox et al. | |
| 8,250,033 B1 * | 8/2012 | De Souter et al. .......... | 707/637 |
| 2004/0172424 A1 * | 9/2004 | Edelstein et al. ............ | 707/201 |
| 2005/0015599 A1 | 1/2005 | Wang et al. | |
| 2005/0132206 A1 | 6/2005 | Palliyil et al. | |
| 2007/0074290 A1 | 3/2007 | Kobayashi et al. | |
| 2008/0133518 A1 * | 6/2008 | Kapoor et al. ............... | 707/6 |
| 2008/0270363 A1 * | 10/2008 | Hunt et al. .................. | 707/3 |
| 2009/0089880 A1 | 4/2009 | Kobayashi et al. | |
| 2009/0158432 A1 | 6/2009 | Zheng et al. | |
| 2009/0240904 A1 | 9/2009 | Austruy et al. | |
| 2010/0011178 A1 | 1/2010 | Feathergill | |
| 2011/0029713 A1 * | 2/2011 | Wade et al. .................. | 711/6 |
| 2012/0016840 A1 * | 1/2012 | Lin et al. .................... | 707/626 |

* cited by examiner

*Primary Examiner* — Heather Herndon
*Assistant Examiner* — Gina Davanlou

(57) ABSTRACT

Software, systems, and methods are disclosed herein for enhanced updating of replica storage volumes within virtual machine environments. A first group of data blocks of a plurality of data blocks on an underlying storage volume that have changed are identified. A second group of data blocks of the first group of data blocks that are live are identified. Changed data items associated with the second group of data blocks are identified. An ancillary process is initiated on the changed data items. An update of the replica of the target storage volume with the second group of data blocks is also initiated.

20 Claims, 4 Drawing Sheets

SOFTWARE, SYSTEMS, AND METHODS FOR ENHANCED REPLICATION WITHIN VIRTUAL MACHINE ENVIRONMENTS

RELATED APPLICATIONS

This application claims the benefit of U.S. Provisional Application Ser. No. 61/370,523, filed Aug. 4, 2010 and entitled "DATA REPLICATION SYSTEM FOR SMART REPLICATION," the disclosure of which is hereby incorporated by reference in its entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, storage volumes within the virtual machines contain data items that need to be accessed. For example, word processing documents may be stored on a virtual drive within the virtual machine, which itself is stored on a physical disk, often times as a flat file or group of files. Unfortunately, accessing the underlying contents of a storage volume can be very resource intensive as it requires navigating both physical and virtual layers.

In addition to complications associated with access, moving or copying virtual machines can also be very resource intensive. For instance, backup or replication processes may require substantial amounts of bandwidth to effectively copy or transfer virtual machines or their sub-components. This is because the file or files that comprise the virtual machine tend to be very large since they contain not only user data, such as word processing documents, but also operating components, such as operating system files, application files, and the like.

These challenges not only limit the wide-spread adoption of virtual machine technologies, but also impede the introduction and integration of other features with backup and replication processes, such as virus scanning, content protection, and other tools that would be useful within virtual machine environments.

Overview

Software, systems, and methods described herein provide for improved backup and replication within virtual machine environments. In particular, embodiments disclosed below allow for the integration of ancillary processes, such as virus scanning and malware detection, with transfer processes (backup and replication). The resulting improvements reduce the time and bandwidth required for backup and replication, while also enhancing their utility.

In an embodiment, a non-transitory computer-readable medium has stored thereon program instructions for updating a replica of a target storage volume associated with a plurality of data blocks on an underlying storage volume. The program instructions, when executed by a data control system, direct the data control system to identify a first group of data blocks of the plurality of data blocks on the underlying storage volume that have changed, identify a second group of data blocks of the first group of data blocks that are live, identify changed data items associated with the second group of data blocks, initiate an ancillary process on the changed data items, and initiate an update of the replica of the target storage volume with the second group of data blocks.

In another embodiment, a data control system comprises an interface and a processing system. The interface is configured to receive an instruction to update the replica. The processing system is configured to identify a first group of data blocks of the plurality of data blocks on the underlying storage volume that have changed, identify a second group of data blocks of the first group of data blocks that are live, identify changed data items associated with the second group of data blocks, initiate an ancillary process on the changed data items, and initiate an update of the replica of the target storage volume with the second group of data blocks.

In another embodiment, a method of updating a replica of a target storage volume associated with a plurality of data blocks on an underlying storage volume comprises identifying a first group of data blocks of the plurality of data blocks on the underlying storage volume that have changed, identifying a second group of data blocks of the first group of data blocks that are live, identifying changed data items associated with the second group of data blocks, initiating an ancillary process on the changed data items, and initiating an update of the replica of the target storage volume with the second group of data blocks.

In another embodiment, the ancillary process comprises a virus scan, and wherein the update of the replica is stopped if the results indicate that that at least one of the changed data items is not clean.

In another embodiment, the ancillary process comprises a content check, and wherein the update of the replica is stopped if the results indicate that that at least one of the data items includes content that should not be included in the update according to a content policy.

In another embodiment, the second group of data blocks comprises a snapshot of the target storage volume and the replica of the target storage volume is returned to a previous state in response to results of the ancillary process.

In another embodiment, the update of the replica comprises a transfer of the second group of data blocks to a replica virtual machine environment.

In another embodiment, the update of the replica of the target storage volume includes a transfer of the second group of data blocks to a second underlying storage volume and omission of data blocks not in the first group of data blocks or the second group of data blocks from the transfer.

In another embodiment, the underlying storage volume comprises a virtual disk file containing a virtual machine, and wherein the target storage volume comprises a virtual drive within the virtual machine.

In another embodiment, an inclusion of at least one of the changed data items in the update of the replica based on results of the ancillary process is prevented.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Systems and methods are described herein for creating and maintaining data stored in a plurality of storage volumes. In at least one example, blocks that are both allocated and live are transferred from a first storage volume to a second storage volume as part of a backup or replication process. In some examples, blocks that have also been changed are transferred from one storage volume to another storage volume as part of the backup or replication process while unallocated, non-live, and/or unchanged blocks within the first storage volume are omitted from transfer. Omitting the transfer of unallocated, non-live, and/or unchanged blocks may reduce the amount of data that is accessed and transferred, thereby improving the speed and efficiency of the transfer process.

In addition, in some example ancillary processes are integrated with the backup and/or replication processes. These ancillary processes, such as virus scanning, malware detection, and content protection solutions, can be employed for only those data items associated with changed blocks, thereby reducing load on the ancillary processes, but also on the backup and replication processes.

Figure 1:
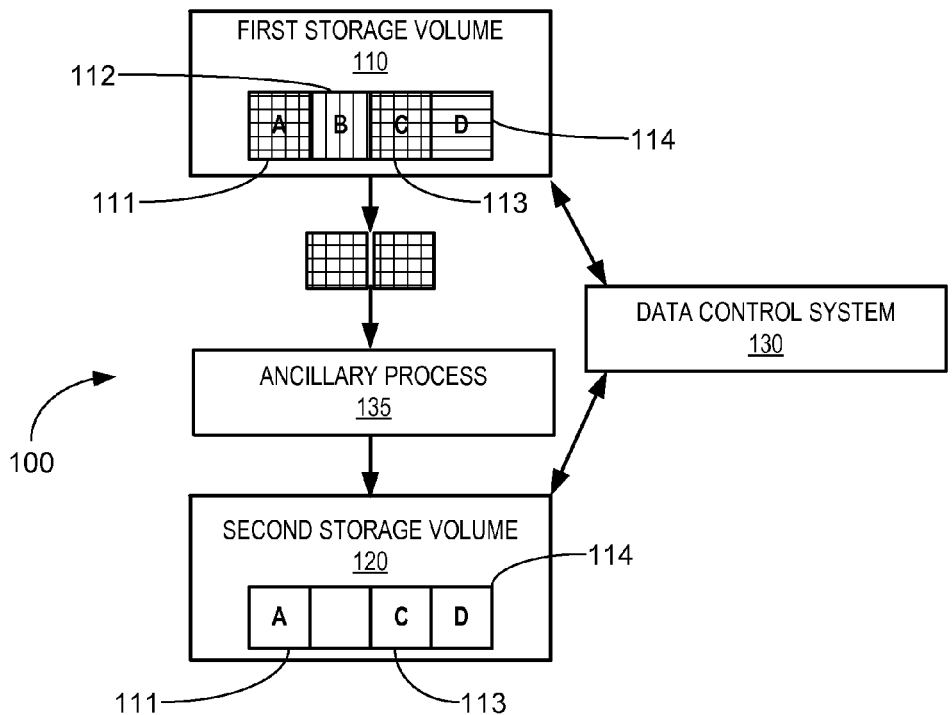
FIG. 1 illustrates a data storage system according to one example.

FIG. 1 illustrates a data storage system 100 that includes a first storage volume 110 and a second storage volume 120. For ease of reference, the second storage volume 120 will be discussed as being a replica or backup of the first storage volume 110.

The data storage system 100 further includes a data control system 130 that controls the transfer of data blocks 111-114 as appropriate from the first storage volume 110 to the second storage volume 120. Further, for illustration purposes, blocks within the first storage volume 110 that have been changed are represented by the presence of vertical lines while unchanged blocks are represented by the absence of vertical lines. Accordingly, block 111 is live and changed, block 112 is changed but not live, block 113 is live and changed, and block 114 is live but unchanged.

As will be discussed at an appropriate point hereinafter, the data storage system 100 is configured to cause the data control system 130 to control backup and/or replication processes in which only those blocks that are live and changed are transferred from the first storage volume 110 to the second storage volume 120. As a result, data control system 130 transfers blocks 111 and 113, which are the blocks in the first storage volume 110 that are both live and changed, to the second storage volume 120. Block 112 is changed but is not live and thus is not transferred. Further, block 114 is live but is unchanged and thus is the same in both the first storage volume 110 and the second storage volume 120 and may be omitted from the transfer shown in FIG. 1. As a result, the number of blocks transferred as part of a backup or replication process may be decreased, thereby increasing the speed and efficiency of such a process.

Figure 2:
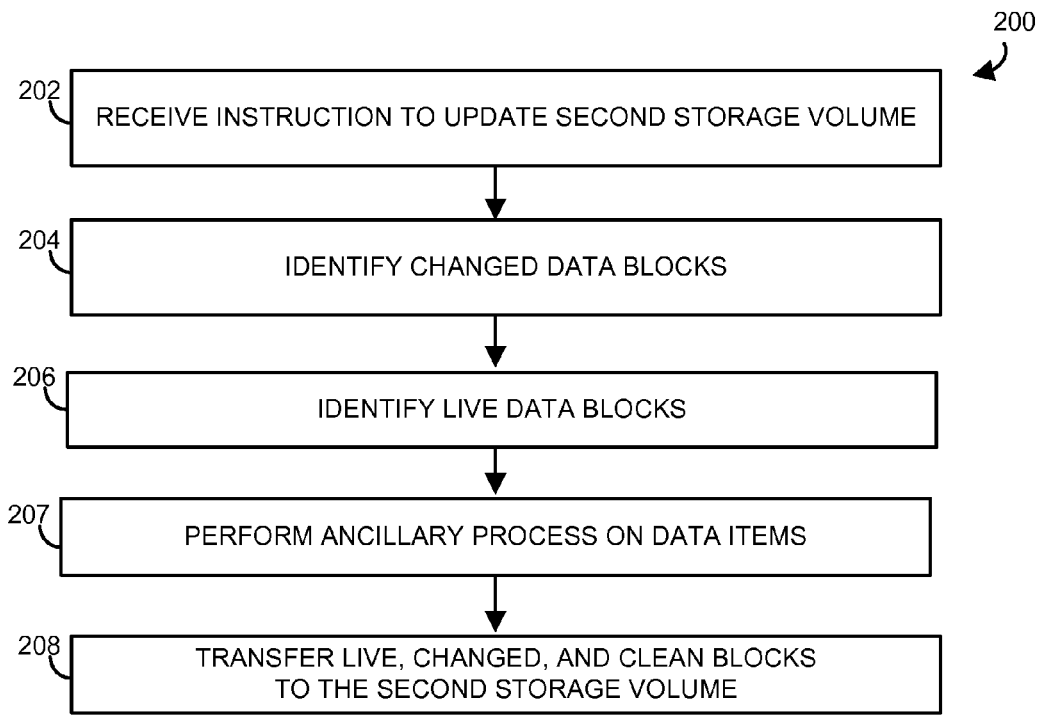
FIG. 2 illustrates an exemplary operation of a data storage system.

One such method is shown in FIG. 2. As shown in FIG. 2, a method (200) of transferring data begins (202) by receiving an instruction to update the second storage volume 120. This instruction may be an instruction to initiate a backup process, a replication process, or some other type of process. The instruction may be generated internally to data control system 130, or may be received from an external source.

The data control system 130 then identifies the changed blocks (204) as well as the live data blocks (206) in the first storage volume 110. The changes to the blocks may be changes that have occurred over any desired interval. For example, the data control system 130 may identify blocks that have changed subsequent to a previous transfer.

An ancillary process 135 (or processes) is then applied to data items associated with these blocks (207). Examples of ancillary processes include virus detection to determine whether files have been corrupted by a virus, malware detection to determine if systems are infected with malware, and content protection processes to ensure that content policies are followed and enforced. Ancillary process 135, while shown as deployed between first storage volume and second storage volume 120, may operate from any variety of platforms, such as within data control system 130, external to data control system 130, or otherwise. In the case of replication between sites, ancillary process 135 could be executed from within either the target site or the destination site, or executed from a platform external to both sites.

Data control system 130 then transfers the live and changed blocks to the second storage volume 120 while omitting the transfer of non-live blocks as well as blocks that have not changed.

In some embodiments, the blocks transferred to second storage volume 120 may be further reduced if results of ancillary process 135 deems some blocks, due to characteristics of their corresponding data items, ineligible for transfer. For instance, blocks associated with infected data items—identified by a virus scan—may be held back from transfer to storage volume 120. Alternatively, yet another ancillary process may be employed in addition to ancillary process 135 to repair any ineligible blocks. For example, infected data items could be cleaned and their associated blocks subsequently transferred to storage volume 120.

As will now be discussed in more detail hereinafter, the configurations introduced in FIGS. 1 and 2 may be used to replicate data in virtual machine environments.

Figure 3:
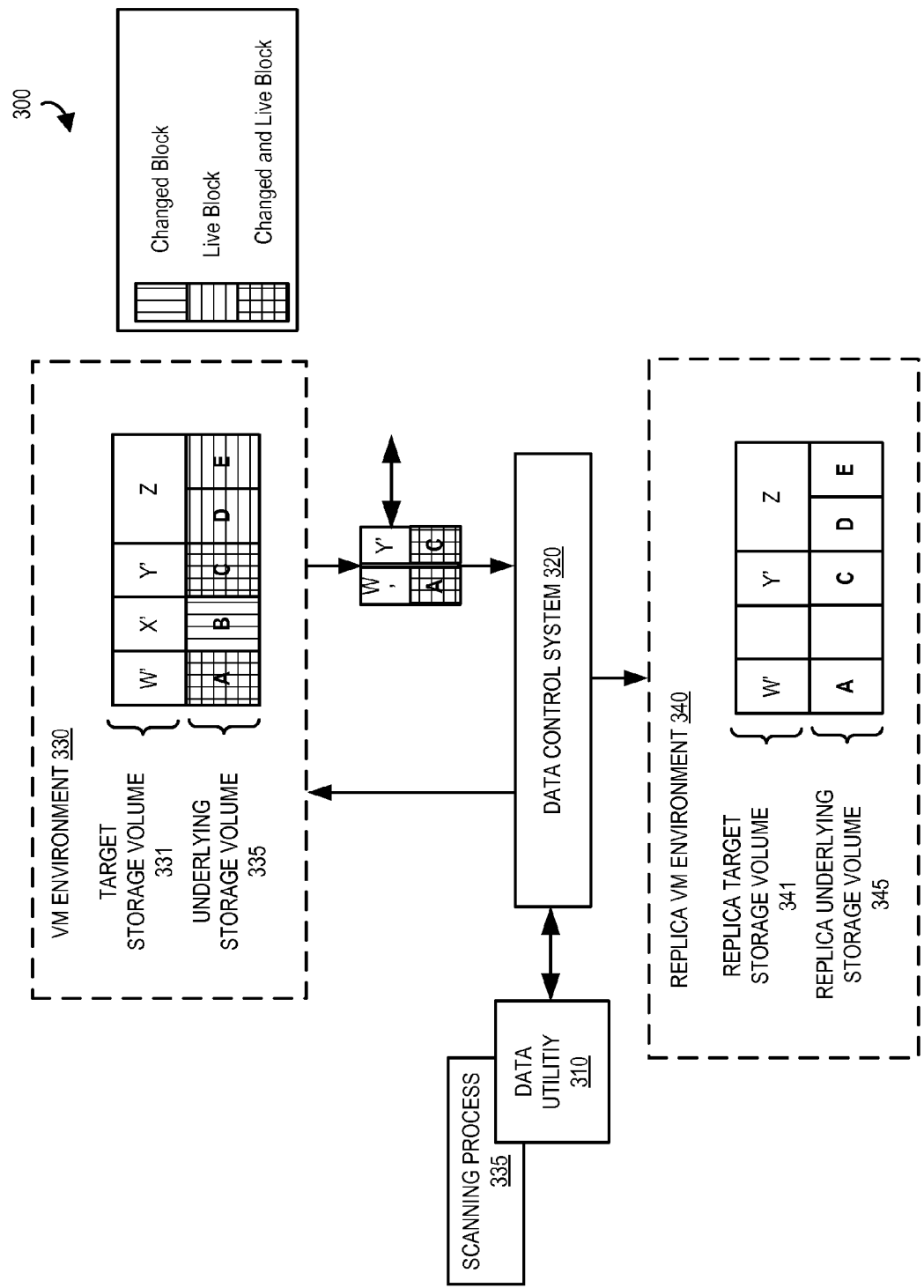
FIG. 3 illustrates a data replication system according to one example.

Referring now to FIG. 3, which illustrates data replication system 300, data replication system 300 includes data utility 310, data control system 320, virtual machine (VM) environment 330, scanning process 335, and replica VM environment 340. Data utility 310 is in communication with data control system 320. Data control system 320 is in communication with VM environment 330 and replica VM environment 340.

VM environment 330 includes an underlying storage volume 335. Underlying storage volume 335 includes target storage volume 331. Elements of VM environment 330 may include, for example, virtual machines, hypervisors, server machines, and other underlying virtual files. Other elements are also possible although not shown for simplicity.

Underlying storage volume 335 includes blocks A, B, C, D, and E. Each block comprises a section of underlying storage volume 335. Underlying storage volume 335 may be, for example, any storage volume capable of storing a volume of data. Underlying storage volume 335 may be, for example, a v-disk file representing a virtual machine. As shown in FIG. 3, block A is a changed block that is live, block B is a changed block that is not live, block C is a changed block that is live, block D is an unchanged live block, and block E is an unchanged live block.

Target storage volume 331 includes data items W, X, Y, and Z. Data items W, X, and Y are shown as W', X', and Y' to indicate that the data items have changed. Target storage volume 331 may be, for example, any storage volume capable of storing a volume of data. Target storage volume 331 may be, for example, a virtual disk and/or a virtual hard drive on a virtual machine.

In this example a single underlying storage volume 335 is shown for simplicity. Those skilled in the art will appreciate that VM environment 330 may include more than one underlying storage volume 335. Further, a single target storage volume 331 is shown stored on underlying storage volume 335. Those skilled in the art will appreciate that more than one target storage volume 331 may be included in each underlying storage volume 335.

Replica VM environment 340 includes a replica underlying storage volume 345. Replica underlying storage volume 345 includes replica target storage volume 341 (a replica of storage volume 331). Replica underlying storage volume 345 includes blocks A, C, D, and E. Each block comprises a section of replica underlying storage volume 345. Data block B does not exist in replica underlying storage volume 345 because block B of underlying storage volume 335 is not live, and therefore, data block B is never generated and/or updated.

Replica underlying storage volume 345 may be, for example, any storage volume capable of storing a volume of data. In this example, replica VM environment 340 is geographically diverse from VM environment 330.

A replica of target storage volume 331 is shown as replica target storage volume 341. Replica target storage volume 341 may be, for example, any storage volume capable of storing a volume of data. Replica target storage volume 341 includes data items W', Y', and Z. Data items W' and Y' are the updated (or changed) data items of the original data items W and Y. In this example, data item Z has not been updated because blocks D and E of underlying storage volume 335 did not change. In addition, changed data item X' does not exist because, as discussed, block B of underlying storage volume 335 is not live.

Those skilled in the art will appreciate that replicas may not be exact copies of the original storage volumes. For example, when creating a replica at a geographically diverse location, a control system may transfer only those blocks that are allocated ("live") and are non-transient.

Free blocks (or unallocated blocks) are identified prior to reading the unallocated blocks. This allows for copying a disk volume without having to read the contents of the free blocks. Rather, the allocation status of the blocks may be read from the volume meta data (bitmap). This optimizes the reading of VM environment 330 and writes to replica VM environment 340.

Non-transient blocks are those blocks containing files that are not temporarily stored. For example, in some instances Microsoft Word and other software applications create temporary files. These files are temporary and unimportant to the back-up software. As such, these transient files need not be accessed and transferred during replication.

Data control system 320 provides data utility 310 with access to VM environment 330. Data control system 320 may be any device or system capable of receiving a replication instruction from data utility 310 (e.g., new replication instruction or update replication instruction) and executing the instruction.

In one embodiment, to provide access to data utility 310, data control system 320 generates and provides a unified file system view to data utility 310. The unified file system view includes elements of VM environment 330 in an easily accessible view allowing a standard data utility 310 such as, for example, a PC-based backup system to view and walk the file system in order to scan and/or backup the necessary files and/or blocks. Those skilled in the art will appreciate that in order to backup the necessary data items and/or data blocks, data utility 310 may transfer blocks to replica VM environment 340 before and/or after scanning the data items and/or data blocks.

Scanning process 335 (or processes) is then applied to data items associated with these blocks. Scanning process 335, while shown as integrated with data utility 310, may operate from any variety of platforms, such as within data control system 320, external to data control system 320, or otherwise external to data utility 310. In the case of replication between sites, scanning process 335 could be executed from within either the target site or the destination site, or executed from a platform external to both sites.

Those skilled in the art will appreciate that although shown separately, data control system 320 may be within VM environment 330, within replica VM environment 340, or, as shown, separate and distinct from both VM environment 330 and replica VM environment 340. Additionally, data control system 320 may be distributed throughout the data replication system 300. Furthermore, those skilled in art will appreciate that data may need to be accessed for a variety of applications. For example, data may need to be accessed for scanning, for identifying changed data items on a computer (e.g., data forensics), for compliance needs, or in order to log system changes.

Figure 4:
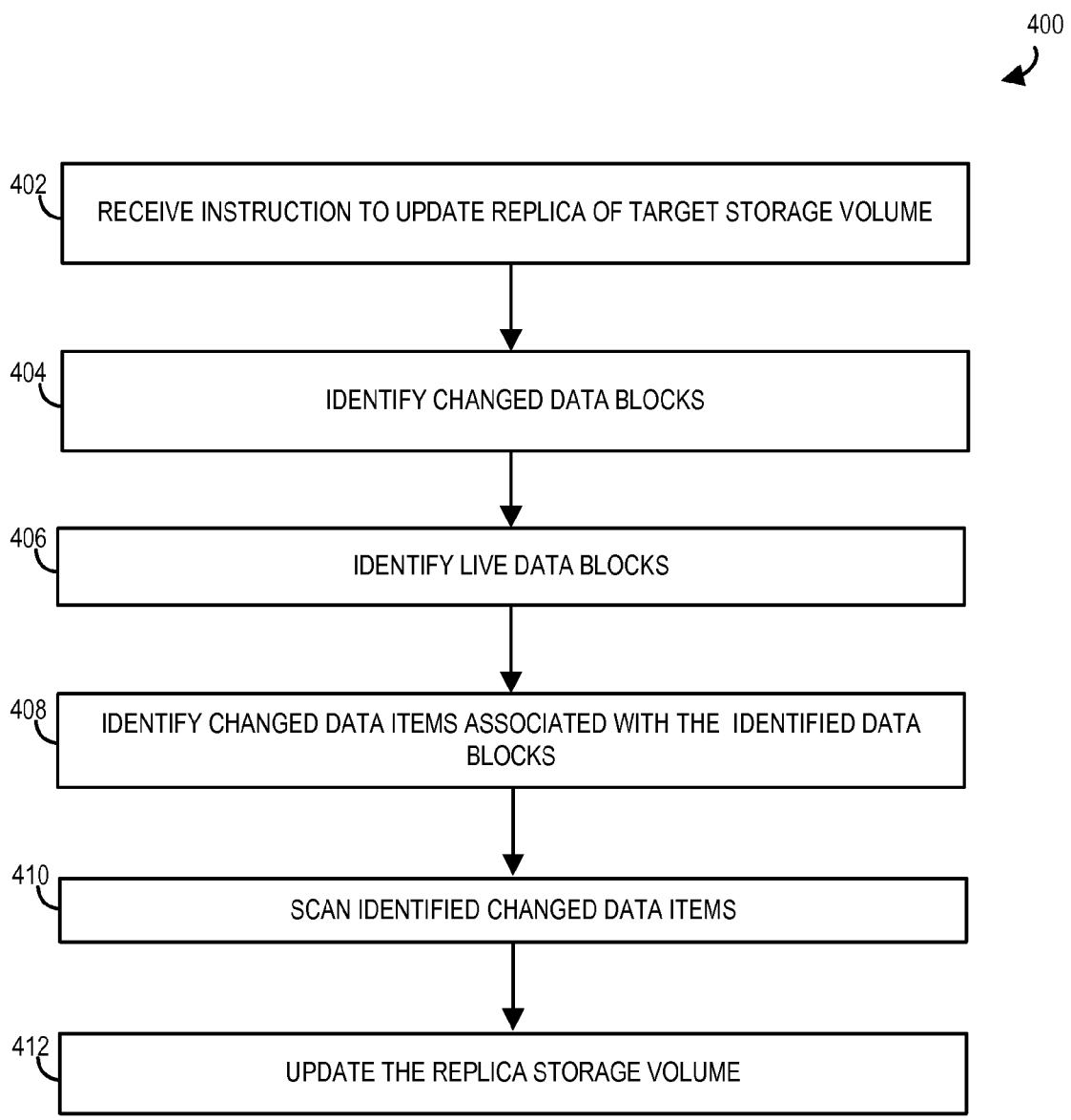
FIG. 4 illustrates the operation of a data replication system according to one example.

FIG. 4 illustrates a process 400 describing the operation of data control system 320 for updating replica target storage volume 341 on replica underlying storage volume 345. To begin, data control system 320 receives an instruction to update a replica of target storage volume 331 (Step 402). The instruction may be received from a user, from the data control system 320, from an external source, or from some combination thereof. In the example illustrated in FIG. 3, the replica of target storage volume 331 is replica target storage volume 341. The instruction may indicate that data control system 320 replicate the data items on target storage volume 331 and/or the data blocks on underlying storage volume 335. In addition, the instruction may indicate that the data control system 320 scan the data items and/or the data blocks before and/or after replication.

Data control system 320 then identifies changed data blocks (Step 404). In this example, data control system 320 identifies blocks A, B, and C as changed. The changed data blocks may be determined using a changed block list that may be maintained by the storage volume, other elements in VM environment 330, or data control system 320.

Once the changed data blocks are identified, data control system 320 identifies which of the changed blocks are also allocated or "live" (Step 406). In this example, data control system 320 identifies blocks A and C as both changed and live.

Data control system 320 then identifies changed data items associated with the changed and "live" data blocks (Step 408). In this example, changed data items W' and Y' are identified. Once identified, the changed data items are scanned for viruses and/or other abnormalities (Step 410). In some embodiments, the scanning is done in VM environment 330. In other embodiments, the scanning is done in replica VM environment 340. In yet other embodiments, the scanning is done outside both VM environment 330 and replica VM environment 340.

Finally, replica target storage volume 341 is updated with the identified data blocks (Step 412). In this example, replica underlying storage volume 345 may be updated with blocks A and C corresponding to data items W' and Y'.

Furthermore, in some instances, the data items and/or the data blocks may represent a snapshot of target storage volume 331. A snapshot may be a read-only copy of a data set frozen at a point in time. Snapshots allow applications to continue writing to their data without interruption. For instance, VM environment 330 could have a snapshot of its data items and/or data blocks replicated while still allowing users to access, update, delete, and otherwise change the data items and/or data blocks during replication.

In one example, replica storage volume 341 and/or replica underlying storage volume 345 may be updated with the snapshot while the data items and/or data blocks are concurrently being scanned or before the items are being scanned. In such a case, if a virus or other abnormality is detected, then data control system 320 can roll-back the snapshot and return the replica storage volume 341 and/or replica underlying storage volume 325 to the previous state in time (i.e., remove the updates).

Similarly, the data items and/or the data blocks may be scanned prior to updating the data item and/or data block. In this case, data control system 320 may stop the scan and/or abandon the update if a virus or other abnormality is detected during the scan.

Figure 5:
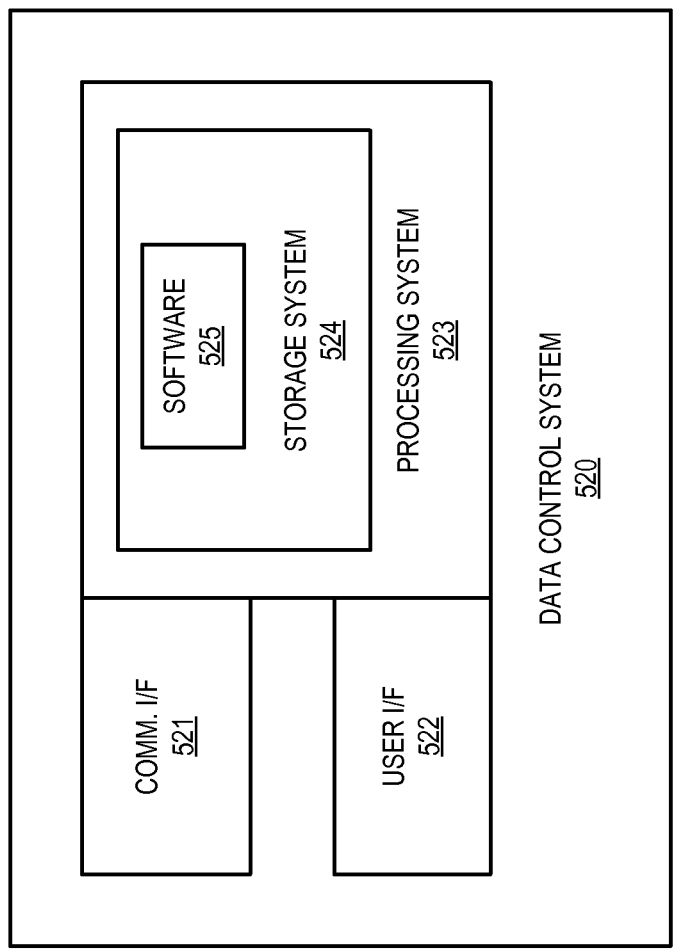
FIG. 5 illustrates a data control system.

FIG. 5 illustrates an example data control system 520. Data control system 520 includes communication interface 521, user interface 522, processing system 523, storage system 524, and software 525. An operational example of data control system 520 is Pancetera Unite from Quantum Corporation. The Unite appliance may run software programs such as SmartRead, SmartView, and SmartMotion, among other programs.

Processing system 523 is linked to communication interface 521 and user interface 522. Processing system 523 includes processing circuitry and storage system 524 that stores software 525. Data control system 520 may include other well-known components such as a power system and enclosure that are not shown for clarity.

Communication interface 521 comprises a network card, network interface, port, or interface circuitry that allows data control system 520 to communicate with data utility 310, VM environment 330, and replica VM environment 340 (all seen in FIG. 3). Communication interface 521 may also include a memory device, software, processing circuitry, or some other communication device. Communication interface 521 may use various protocols, such as host bus adapters (HBA), SCSI, SATA, Fibre Channel, iSCSI, WiFi, Ethernet, TCP/IP, or the like to communicate with data utility 310, VM environment 330, and replica VM environment 340 (all seen in FIG. 3).

User interface 522 comprises components that interact with a user to receive user inputs and to present media and/or information. User interface 522 may include a speaker, microphone, buttons, lights, display screen, mouse, keyboard, or some other user input/output apparatus—including combinations thereof. User interface 522 may be omitted in some examples.

Processing system 523 may comprise a microprocessor and other circuitry that retrieves and executes software 525 from storage system 524. Storage system 524 comprises a disk drive, flash drive, data storage circuitry, or some other memory apparatus. Processing system 523 is typically mounted on a circuit board that may also hold storage system 524 and portions of communication interface 521 and user interface 522. Software 525 comprises computer programs, firmware, or some other form of machine-readable processing instructions. Software 525 may include an operating system, utilities, drivers, network interfaces, applications, or some other type of software. When executed by processing system 523, software 525 directs processing system 523 to operate data control system 320 (FIG. 3) as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon program instructions for updating a replica of a target storage volume associated with a plurality of data blocks on an underlying storage volume that underlies the target storage volume, wherein the program instructions, when executed by a data control system, direct the data control system to:
responsive to an instruction to update the replica, identify a first group of data blocks of the plurality of data blocks on the underlying storage volume that have changed;
identify a second group of data blocks of the first group of data blocks that are live;
identify changed data items included in the target storage volume that are associated with the second group of data blocks;
initiate an ancillary process on the changed data items; and
initiate an update of the replica of the target storage volume with the second group of data blocks.

2. The non-transitory computer-readable medium of claim 1 wherein the ancillary process comprises a virus scan, and wherein the update of the replica is stopped if the results indicate that that at least one of the changed data items is not clean.

3. The non-transitory computer-readable medium of claim 1 wherein the ancillary process comprises a content check, and wherein the update of the replica is stopped if the results indicate that that at least one of the data items includes content that should not be included in the update according to a content policy.

4. The non-transitory computer-readable medium of claim 1, wherein the second group of data blocks comprises a snapshot of the target storage volume and the replica of the target storage volume is returned to a previous state in response to results of the ancillary process.

5. The non-transitory computer-readable medium of claim 1 wherein the update of the replica comprises a transfer of the second group of data blocks to a replica virtual machine environment.

6. The non-transitory computer-readable medium of claim 1, wherein the update of the replica of the target storage volume includes a transfer of the second group of data blocks to a second underlying storage volume and omission of data blocks not in the first group of data blocks or the second group of data blocks from the transfer.

7. The non-transitory computer-readable medium of claim 1 wherein the underlying storage volume comprises a virtual disk file containing a virtual machine, and wherein the target storage volume comprises a virtual drive within the virtual machine.

8. A data control system for updating a replica of a target storage volume associated with a plurality of data blocks on an underlying storage volume that underlies the target storage volume, the data control system comprising:
    an interface configured to receive an instruction to update the replica;
    a processing system comprising processing circuitry configured to:
        identify a first group of data blocks of the plurality of data blocks on the underlying storage volume that have changed;
        identify a second group of data blocks of the first group of data blocks that are live;
        identify changed data items included in the target storage volume that are associated with the second group of data blocks;
        initiate an ancillary process on the changed data items; and
        initiate an update of the replica of the target storage volume with the second group of data blocks.

9. The data control system of claim 8 wherein the ancillary process comprises a virus scan, and wherein the update of the replica is stopped if the results indicate that that at least one of the changed data items is not clean.

10. The data control system of claim 8 wherein the update of the replica comprises a transfer of the second group of data blocks to a replica virtual machine environment.

11. The data control system of claim 8, wherein the second group of data blocks comprises a snapshot of the target storage volume and the replica of the target storage volume is returned to a previous state in response to results of the ancillary process.

12. The data control system of claim 8, wherein the update of the replica of the target storage volume comprises a transfer of the second group of data blocks to a second underlying storage volume and omission of data blocks not in the first group of data blocks or the second group of data blocks from the transfer.

13. The data control system of claim 8 wherein the underlying storage volume comprises a virtual disk file containing a virtual machine, and wherein the target storage volume comprises a virtual drive within the virtual machine.

14. A method of updating a replica of a target storage volume associated with a plurality of data blocks on an underlying storage volume that underlies the target storage volume, the method comprising:
    identifying a first group of data blocks of the plurality of data blocks on the underlying storage volume that have changed;
    identifying a second group of data blocks of the first group of data blocks that are live;
    identifying changed data items included in the target storage volume that are associated with the second group of data blocks;
    initiating an ancillary process on the changed data items; and
    initiating an update of the replica of the target storage volume with the second group of data blocks.

15. The method of claim 14 wherein the ancillary process comprises at least a one of virus scan, a content check, and a malware detection process.

16. The method of claim 14 comprising preventing an inclusion of at least one of the changed data items in the update of the replica based on results of the ancillary process.

17. The method of claim 14 wherein the update of the replica comprises a transfer of the second group of data blocks to a replica virtual machine environment.

18. The method of claim 14, wherein the second group of data blocks comprises a snapshot of the target storage volume and the replica of the target storage volume is returned to a previous state in response to results of the ancillary process.

19. The method of claim 14, wherein the update of the replica of the target storage volume comprises a transfer of the second group of data blocks to a second underlying storage volume and omission of data blocks not in the first group of data blocks or the second group of data blocks from the transfer.

20. The method of claim 14 wherein the underlying storage volume comprises a virtual disk file containing a virtual machine, and wherein the target storage volume comprises a virtual drive within the virtual machine.

\* \* \* \* \*